April 28, 1953  G. A. BLUE  2,636,247
CAVITY AND HYPO INJECTOR FOR EMBALMERS
Filed Oct. 5, 1949

INVENTOR.
G. A. Blue
BY Robt. Cobb
Attorneys.

Patented Apr. 28, 1953

2,636,247

UNITED STATES PATENT OFFICE 2,636,247

CAVITY AND HYPO INJECTOR FOR EMBALMERS

Glenn A. Blue, Emporia, Kans.

Application October 5, 1949, Serial No. 119,723

1 Claim. (Cl. 27—24)

The present invention relates to injectors, and more particularly, to a new and improved cavity and hypo injector for use by embalmers in injecting cavity fluids into the pleural and abdominal cavities after the arterial embalming is completed, and for hypo injection work where arterial embalming is difficult or impossible by reason of advanced decomposition, mutilation or other extensive damage to the body or limbs which are to be embalmed.

Heretofore, it has been the usual practice of embalmers to purchase these embalming fluids from a supply house which generally puts up such fluids in glass bottles or other shipping or storage containers having appropriate markings or other graduations denoted thereon for indicating the quantity of fluid therein and for facilitating the measurement of predetermined amounts of fluid removed therefrom, as required for a particular embalming operation. The required amount of fluid is customarily poured from said container into a mixing vessel or bottle from which it is dispensed as needed, usually by gravity flow through a small rubber tube or other flexible hose having an injection needle, called a trocar, connected to the free end thereof.

Since these embalming fluids are composed of strong chemicals and contain substantial proportions of formaldehyde which gives off a very strong and pungent odor when exposed to the atmosphere, the pouring of the fluids from the original containers into the mixing or dispensing vessel allows the fumes to escape into the preparation room, thereby producing very disagreeable and objectionable odors.

It is the primary object of the present invention to obviate these difficulties by the provision of an injection device which eliminates the step of pouring the embalming fluid from its original or shipping container into a mixing or other dispensing vessel, and which otherwise facilitates and expedites the injection of the embalming fluid into the body.

Another object of the invention is to provide a simple and improved injection device, preferably having the form of a unitary attachment, which may be easily and quickly attached directly to the shipping or other original container or bottle in which embalming fluids are customarily supplied to embalmers, without danger of breakage or damage of the container, thereby permitting the container or bottle itself to be used as a handle for inserting and manipulating the trocar which forms a part of said attachment, during the injection of the fluid.

A further object of the invention is to provide an improved injection device of the aforementioned character, wherein the injection fluid may be injected either by gravity flow, or under super-atmospheric pressure, or a combination of both, as desired, said device being provided with a simple and effective pressure-producing means which may be operated at will by the embalmer by one hand, while leaving the other hand free to hold and manipulate the injection device by the utilization of the container or bottle to which it is attached, as a handle.

Other and further objects and advantages of the invention will be hereinafter described and the novel features thereof defined by the appended claim.

Figure 1:
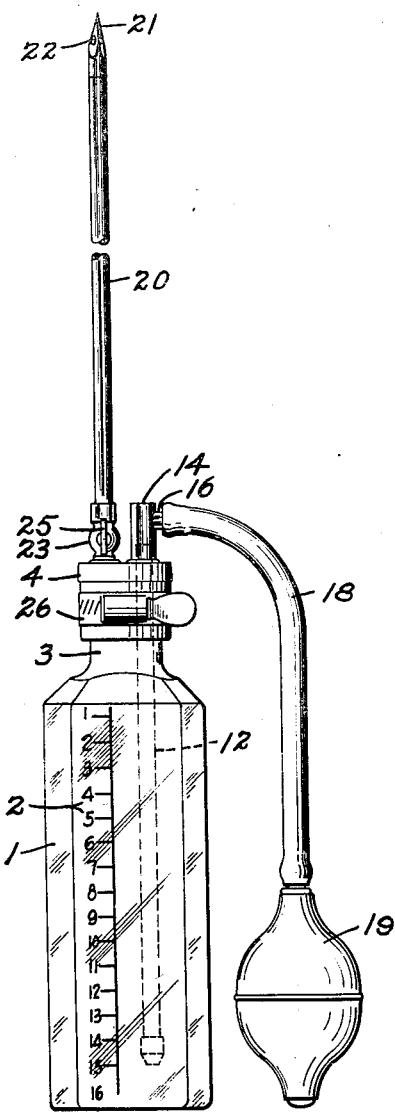
Figure 1 is a view in elevation of my improved injection device, with the same attached or applied onto the fluid shipping or storage container or bottle in which the embalming fluid is customarily sold to the embalmer, and said container or bottle forming a convenient handle for the device.

Like reference characters designate corresponding parts in the several figures of the drawing, wherein I generally denotes a conventional shipping or storage container for embalming fluids as customarily supplied by embalmers' supply houses to embalmers, said container usually having the form of a glass bottle which is provided with graduations designated 2 or other appropriate markings to indicate the quantity of fluid contained therein, and to facilitate the measurement of pre-determined quantities of such fluid as the same are removed therefrom. These bottles or containers, as supplied by different manufacturers or supply houses, may be of different sizes and/or shapes, but are usually provided with a reduced neck 3 having screw threads formed thereon for threadedly receiving a screw cap or other closure to close the mouth of the bottle during storage or shipment. The threads and the size of the bottle neck 3 will ordinarily vary slightly with different manufacturers, although the range of such variations is usually relatively small, but enough that they are not uniform.

It has accordingly been the practice of embalmers in using these embalming fluids to remove the cap or closure from the shipping or storage containers and then pour out the required amount of fluid into a mixing or dispensing vessel from which the fluid is injected into the body to be embalmed, usually with the aid of a small rubber tube or other flexible hose to which an injection needle is attached at the free end thereof, said needle being known to the trade as a trocar. Because of the strong chemicals of which the embalming fluids are composed, and which usually contain substantial proportions of formaldehyde, the pouring of the fluids from the original shipping or storage containers into a mixing or dispensing vessel allows the strong and pungent fumes to escape into the surrounding air, with consequent creation of disagreeable and objectionable odors in the preparation room where the embalming operations are performed and even into adjacent rooms to which the fumes will usually spread in a relatively short time.

In order to eliminate these disagreeable odors and to otherwise facilitate and expedite the injection of the fluids into bodies to be embalmed, the present invention contemplates the utilization of a simple and improved injection device having the form of a unitary attachment which may be easily and quickly applied directly onto the original shipping or storage container 1 in the manner illustrated in Figure 1 of the drawing, so that the fluid may be injected into the body directly from the original container, thus avoiding and eliminating the step of pouring the contents from the container into a mixing or other separate dispensing vessel, or otherwise exposing the fluid to the atmosphere for any appreciable length of time.

Figure 2:
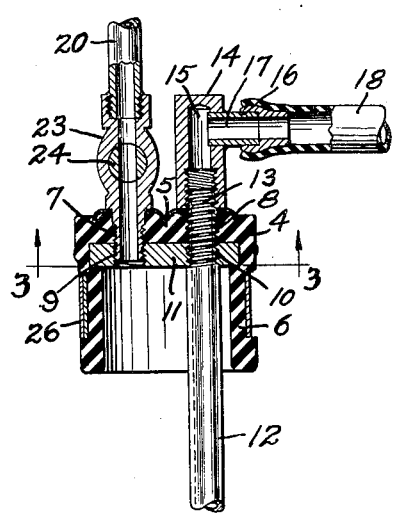
Figure 2 is an enlarged vertical sectional view taken centrally through the injection device alone, without the container or bottle, and with the outer end of the trocar and the free end of the vent tube and the pressure bulb broken away.
Figure 3:
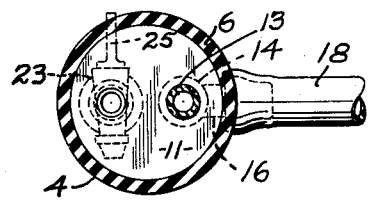
Figure 3 is a horizontal sectional view taken on the line 3—3 of Figure 2.

As best shown in Figures 2 and 3, the injection device or attachment includes a resilient cap 4 of rubber or other suitable flexible and yieldable material, said cap having an end wall 5 from which depends an annular skirt 6 of such internal diameter as will fit onto the neck 3 of the usual shipping or storage container 1, said skirt being sufficiently yieldable to accommodate bottle necks of the different sizes usually encountered with different manufacturers, and regardless of whether the bottle necks are threaded to receive closures of the screw type or otherwise. Thus, the rubber or resilient cap 4 is so designed as to fit any of the conventional containers 1 with a slip-on fit, and because of its resilient or yieldable character, the cap 4 will not mutilate or otherwise damage or break the neck of the container when applied thereto, as otherwise would be likely to occur if the cap 4 were made of metal or other rigid material which would also require a special and separate cap for each of the different containers in which embalming fluids are customarily sold by different manufacturers.

The cap 4 may be easily and cheaply molded of rubber, during which two holes, respectively designated 7 and 8, are formed in the end wall 5 of the cap, said holes registering with corresponding holes 9 and 10 in a rigid insert 11 of metal or other appropriate material, said holes 9 and 10 being threaded.

As shown in Figure 2, the insert 11 lies against and extends transversely across the inner face of the end wall 5 of the cap 4 with the marginal edge of the insert embedded and molded in the surrounding rubber or other resilient material from which the cap 4 is molded.

Connected to the cap 4 and extended downwardly therefrom is a vent tube 12, said vent tube being of such length as to extend approximately to the bottom of the container 1 when the cap 4 is applied onto the mouth or neck 3 of the container, as shown in Figure 1. The upper end of the vent tube is threaded as at 13, the threaded end being of such length as to screw completely through one of the holes such as 10, in the insert 11 and through the corresponding plain hole 8 in the end wall 5 of the cap with the extreme upper end of the vent tube extended somewhat beyond the upper face of the end wall 5. Threadedly screwed onto the extreme upper end of the vent tube which projects from the upper side of the cap 4 is a coupling member 14 having a vertically extended passage 15 formed therein which communicates with a laterally extended tubular member 16 having a passage 17 provided therethrough, said member 16 being suitably connected to a short rubber or other flexible tube or hose 18 having a compressible rubber bulb or pump 19 suitably connected to the opposite end thereof as shown in Figure 1. The bulb or pump 19 is of conventional construction and is provided with a valve (not shown) which allows air to be forced through the hose or tube 18 and through the vent tube 12 into the container 1, on compression of the bulb 19 while preventing the air from escaping from the bulb to the atmosphere when the pressure on the bulb is released.

Also attached to the cap 4 and extending outwardly therefrom in a direction opposite to the vent tube 12, is an injection needle or trocar 20, said trocar being of any suitable size and length as required for various embalming work as practiced by embalmers in injecting the embalming fluid. The trocar is hollow and terminates at its free end in a sharpened point 21 which is provided with a plurality of openings 22 as customary, to allow the fluid to be discharged from the trocar.

In attaching the trocar 20 to the cap 4, the inner end of the trocar is preferably threadedly connected to a pet-cock 23 having a shut-off valve 24 which may be turned by a handle 25 extended laterally therefrom, the inner end of the pet-cock being extended through the hole 7 in the end wall 5 of the cap 4 and threadedly connected to the threaded hole 9 in the insert 11. By closing the valve 24 of the pet-cock 23, pressure can be built up in the container 1 by alternately compressing and releasing the bulb or pump 19, after which the embalming fluid within the container 1 can be released by opening the pet-cock so as to allow the fluid to be discharged from the free end of the trocar under super-atmospheric pressure. This materially expedites and facilitates the injection of the embalming fluid by forcing the same around the intestines in the abdominal cavities, and also for hypo injection work where the bodies or limbs are so decomposed or damaged that the arteries cannot be used directly to receive the hypo or other embalming fluid.

The construction and operation of my new injector device will be obvious from the foregoing and may be briefly summarized as follows. Before applying the injector device onto the container 1 the usual closure cap is first removed from the container, after which the cap 4 of the injector device is firmly pressed onto the neck 3 of the container. The cap 4 is preferably provided with a clamp 26 encircling and embracing the skirt 6 so as to enable the cap to be tightened about the neck of bottles or containers which may vary slightly in size. In Figure 1 of the drawing, I have shown a conventional screw clamp 26 which may be readily operated by hand and thus is excellently adapted to use with the present invention, but since the details of the clamp are not material to the present invention, the same need not be further described, and it should be understood that the invention is not limited to any specific type of clamping means.

After the cap 4 has been applied and tightened on the container 1, the embalming fluid in the container is ready for injection into the body to be embalmed, either by gravity flow, or with the aid of pressure produced by the bulb or pump 19. In either case, the trocar 20 is inserted in the body while the container 1 is held by the embalmer in one hand, with the container serving as a handle for the trocar. The other hand of the embalmer is left free to manipulate the bulb or pump 19 and the valve 24 of the pet-cock 23, said valve being preferably closed until the desired pressure is built up within the container, after which the valve may be opened to allow the fluid to be forced into the body. Ordinarily, only a little pressure is needed for pressure injection, and this pressure can be obtained by squeezing the bulb or pump 19 several times in succession.

On depleting the contents of the container 1, the injection device may be removed quickly and easily from the container and re-applied onto other containers, as desired for further embalming work. Because of the simplicity of my new injection device and the elimination of some of the equipment which has heretofore been required, the present invention has been found to be exceedingly useful and desirable in the embalming field. Besides eliminating the disagreeable and objectionable odors commonly encountered in and around embalming rooms, injection devices constructed in accordance with the present invention enable the placing of the embalming fluid just where it is required, and both faster and easier than most any other type of injector heretofore used.

While the specific details have been herein shown and described, the invention is not confined thereto as changes and alterations may be made without departing from the spirit thereof as defined in the appended claim.

I claim:

An embalming fluid injector for attachment to embalming fluid containers, comprising a cap member of resilient material having an annular skirt adapted to embrace the mouth of said fluid container, said cap member having a rigid insert extended transversely across the same and provided with a threaded opening therein in register with an opening formed in the end wall of said cap member, a hollow trocar threadedly and rigidly connected with the threaded opening in said insert and projecting outwardly therefrom, clamping means exteriorly embracing said annular skirt for releasably securing said cap member on the mouth of said container, shiftable valve means interposed between said cap member and said trocar for respectively interrupting and allowing fluid flow through said trocar at will, and a vent tube carried by said cap member and extended therefrom oppositely to said trocar.

GLENN A. BLUE.

References Cited in the file of this patent

UNITED STATES PATENTS

| Number | Name | Date |
|---|---|---|
| 347,750 | Tutton | Aug. 17, 1886 |
| 379,611 | Shurtleff | Mar. 20, 1888 |
| 383,505 | Wagner | May 29, 1888 |
| 478,940 | Ogram | July 12, 1892 |
| 560,225 | Mills | May 19, 1896 |
| 948,115 | McCourtie | Feb. 1, 1910 |
| 1,059,070 | Roberts | Apr. 15, 1913 |
| 1,335,158 | Drinkwater | Mar. 30, 1920 |
| 1,459,282 | Clark | June 19, 1923 |
| 1,472,889 | Ruggiero | Nov. 6, 1923 |
| 1,554,745 | McMann | Sept. 22, 1925 |
| 1,868,893 | Gentle | July 26, 1932 |
| 2,341,388 | Rocca | Feb. 8, 1944 |

FOREIGN PATENTS

| Number | Country | Date |
|---|---|---|
| 140,674 | Austria | Feb. 25, 1935 |